United States Patent
Standke et al.

(10) Patent No.: US 10,333,350 B2
(45) Date of Patent: Jun. 25, 2019

(54) WIRELESS POWER TRANSFER USING DIRECT FIELD PENETRATION THROUGH A METAL OBJECT

(71) Applicant: QUALCOMM Incorporated, San Diego, CA (US)

(72) Inventors: Randy Standke, San Diego, CA (US); Seong Heon Jeong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 15/167,680

(22) Filed: May 27, 2016

(65) Prior Publication Data

US 2016/0352151 A1  Dec. 1, 2016

Related U.S. Application Data

(60) Provisional application No. 62/168,483, filed on May 29, 2015.

(51) Int. Cl.
| | |
|---|---|
| *H01Q 1/24* | (2006.01) |
| *H02J 7/00* | (2006.01) |
| *H02J 7/02* | (2016.01) |
| *H04B 5/00* | (2006.01) |
| *H01Q 13/10* | (2006.01) |
| *H02J 50/10* | (2016.01) |

(Continued)

(52) U.S. Cl.
CPC ............. *H02J 50/12* (2016.02); *H01Q 1/24* (2013.01); *H01Q 1/243* (2013.01); *H01Q 13/10* (2013.01); *H02J 7/0042* (2013.01); *H02J 7/025* (2013.01); *H02J 50/10* (2016.02); *H02J 50/80* (2016.02); *H04B 5/0037* (2013.01)

(58) Field of Classification Search
None
See application file for complete search history.

(56) References Cited

U.S. PATENT DOCUMENTS

| | | | |
|---|---|---|---|
| 2007/0217163 A1 | 9/2007 | Greatbatch et al. | |
| 2012/0274148 A1* | 11/2012 | Sung | H04B 5/0037 307/104 |

(Continued)

FOREIGN PATENT DOCUMENTS

| | | |
|---|---|---|
| EP | 0977297 A1 | 2/2000 |
| WO | 2014167812 A1 | 10/2014 |
| WO | 2015020141 A1 | 2/2015 |

OTHER PUBLICATIONS

International Search Report and Written Opinion—PCT/US2016/034833—ISA/EPO—dated Oct. 12, 2016—16 pgs.

(Continued)

*Primary Examiner* — Jared Fureman
*Assistant Examiner* — Joel Barnett
(74) *Attorney, Agent, or Firm* — Hunter Clark PLLC

(57) ABSTRACT

An apparatus for wireless power reception in an electronic device may include a casing configured to house electronic components of the electronic device. The casing may include a non-conductive support substrate and a metal layer disposed on the support substrate. The apparatus may include a power receiving element configured to magnetically couple to an externally generated magnetic field to produce power for one or more of the electronic components of the electronic device.

12 Claims, 15 Drawing Sheets

(51) Int. Cl.
*H02J 50/12* (2016.01)
*H02J 50/80* (2016.01)

(56) References Cited

U.S. PATENT DOCUMENTS

| | | |
|---|---|---|
| 2012/0274271 A1 | 11/2012 | Thompson et al. |
| 2013/0257367 A1 | 10/2013 | Someya |
| 2013/0300204 A1* | 11/2013 | Partovi .................. H01F 38/14 307/104 |
| 2014/0176290 A1* | 6/2014 | Jang ....................... H02J 50/10 336/221 |
| 2014/0247188 A1 | 9/2014 | Nakano et al. |
| 2014/0295199 A1 | 10/2014 | Baarman et al. |
| 2015/0028687 A1* | 1/2015 | Ichikawa ............... H01F 38/14 307/104 |
| 2015/0048752 A1 | 2/2015 | Van et al. |
| 2015/0123604 A1* | 5/2015 | Lee ....................... H01F 38/14 320/108 |
| 2015/0137742 A1 | 5/2015 | Tseng et al. |
| 2015/0326057 A1* | 11/2015 | Koyanagi ............. H01M 10/46 320/108 |
| 2016/0079671 A1 | 3/2016 | Yamaguchi et al. |
| 2016/0141099 A1* | 5/2016 | Maekawa ............... H01F 38/14 307/104 |

OTHER PUBLICATIONS

Partial International Search Report—PCT/US2016/034833—ISA/EPO—dated Jul. 27, 2016—7 pgs.

\* cited by examiner

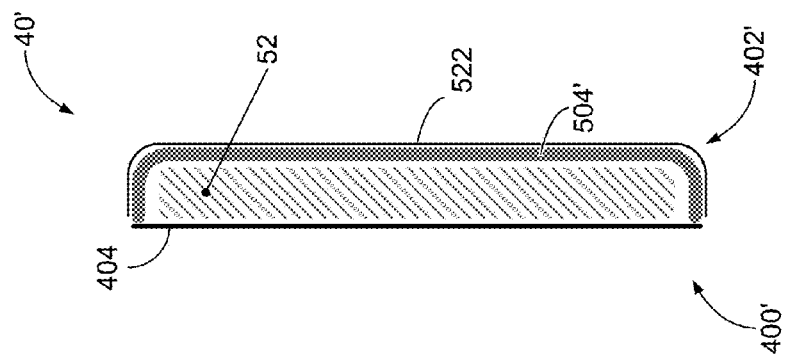
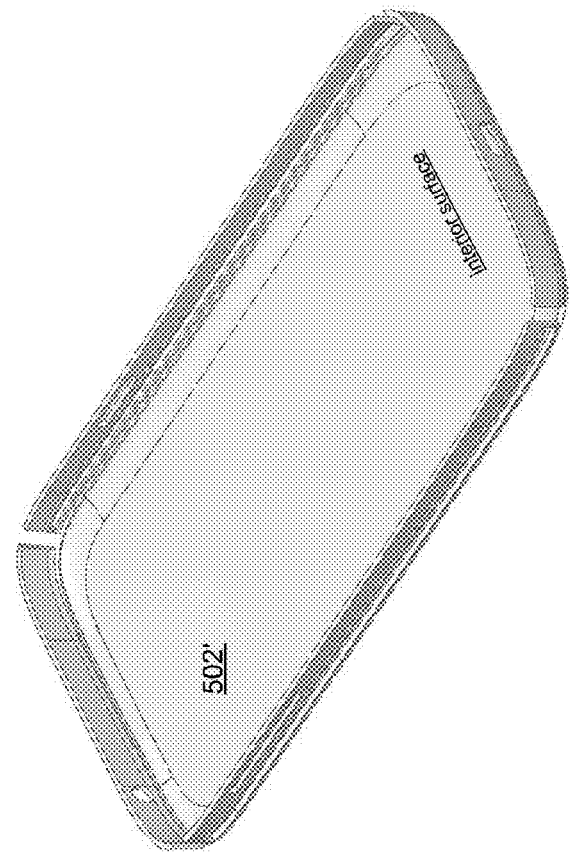
Fig. 5A
Fig. 5B

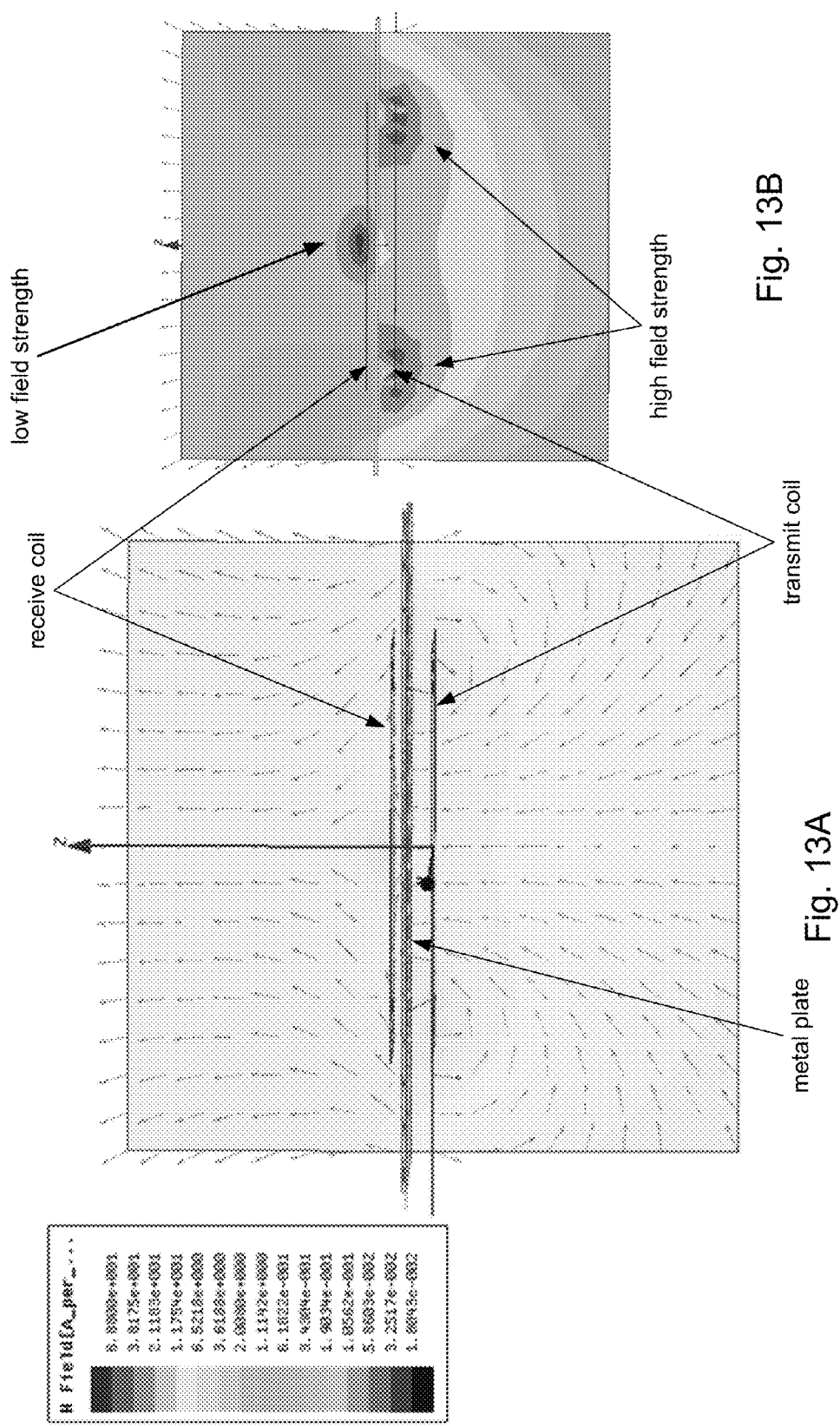

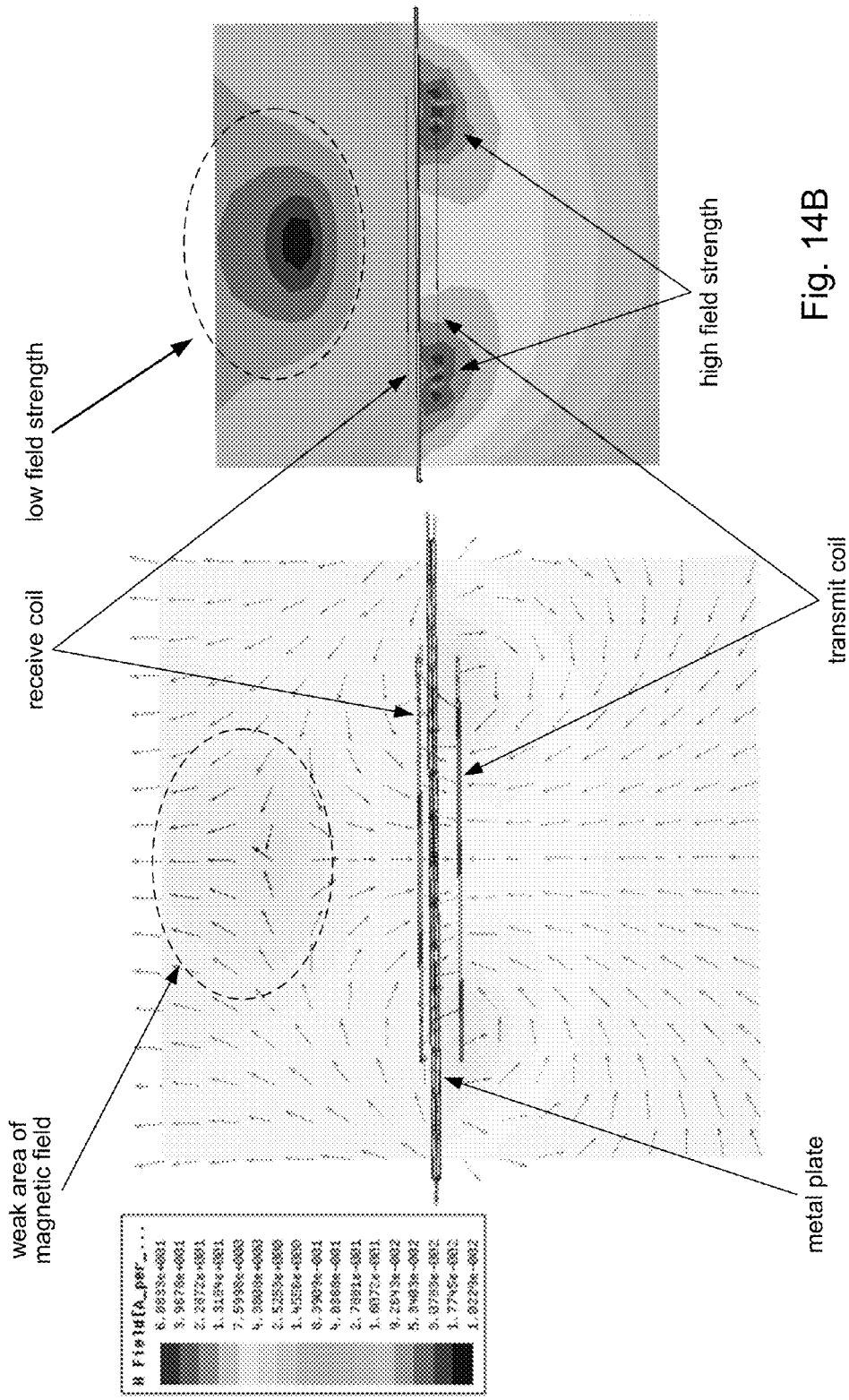

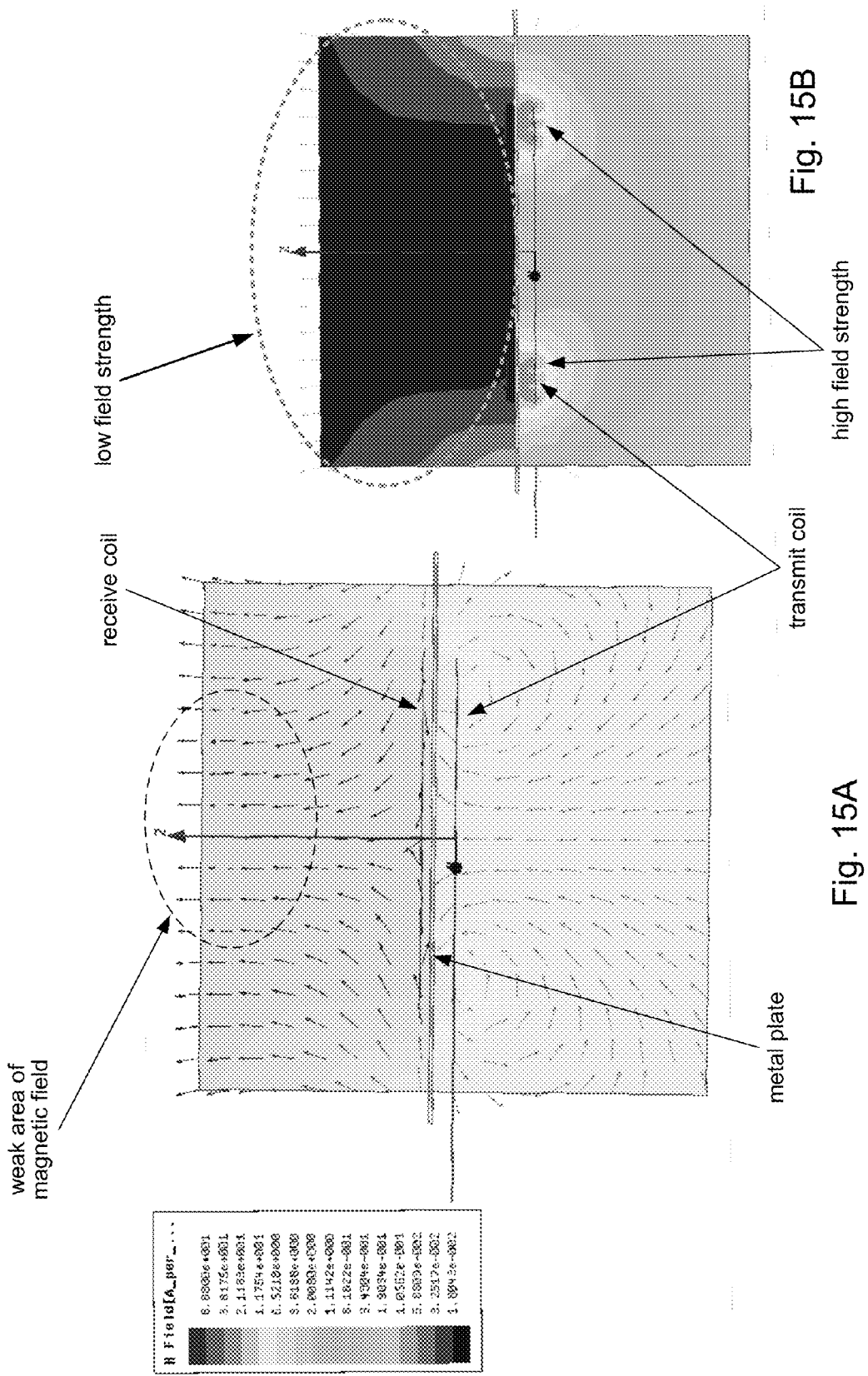

WIRELESS POWER TRANSFER USING DIRECT FIELD PENETRATION THROUGH A METAL OBJECT

CROSS REFERENCE TO RELATED APPLICATIONS

Pursuant to 35 U.S.C. § 119(e), this application is entitled to and claims the benefit of the filing date of U.S. Provisional App. No. 62/168,483 filed May 29, 2015, the content of which is incorporated herein by reference in its entirety for all purposes.

TECHNICAL FIELD

The present disclosure relates generally to wireless power transfer systems. More particularly, the present disclosure relates to wireless power reception in electronic devices having a casing with a solid metal back cover.

BACKGROUND

Unless otherwise indicated, the foregoing is not admitted to be prior art to the claims recited herein and should not be construed as such.

Wireless power transfer is becoming increasingly popular in portable electronic devices, such as mobile phones, computer tablets, etc. Such devices typically require long battery life and low battery weight. The ability to power an electronic device without the use of wires is an attractive solution for users of portable electronic devices. Wireless power transfer gives manufacturers an option for developing solutions to problems due to limited choices for power sources in consumer electronic devices.

Wireless power transfer capability can improve the user's charging experience. In a multiple device charging situation, for example, wireless power transfer may reduce overall cost (for both the user and the manufacturer) because conventional charging hardware such as power adapters and charging chords can be eliminated. There is flexibility in having different coil sizes and shapes on the transmitter and/or the receiver in terms of industrial design and support for a wide range of devices from mobile handheld devices to computer laptops.

SUMMARY

In accordance with aspects of the present disclosure, an apparatus for wireless power reception may include a casing to house electronic components of the electronic device. The casing may include a non-conductive support substrate to house the electronic components and a metal layer disposed on the support substrate. The apparatus may further include a power receiving element configured to magnetically couple to an externally generated magnetic field to produce power for one or more of the electronic components of the electronic device.

In some embodiments, the power receiving element may be arranged relative to an area of the metal layer that defines a continuous, unbroken, uninterrupted surface. The casing may include an opening formed through the support substrate and metal layer.

In some embodiments, the metal layer may be configured such that the externally generated magnetic field penetrates the metal layer to magnetically couple to the power receiving element.

In some embodiments, the power receiving element may be configured to magnetically couple to an induced magnetic field emanates from the metal layer in response to eddy currents induced therein when the metal layer is exposed to the externally generated magnetic field.

In some embodiments, a thickness of the metal layer can be insufficient to provide structural support to the housing.

In some embodiments, rein the metal layer may have a thickness of 0.01 mm or less.

In some embodiments, a frequency of the externally generated magnetic field may be 300 KHz or less.

In some embodiments, the apparatus may further include a resonant circuit defined by the power receiving element and a capacitor network. The circuit may have a resonant frequency equal to a frequency of the externally generated magnetic field.

In some embodiments, the apparatus may further include a ferrite material at least partially overlapping the power receiving element.

In some embodiments, the support substrate may include a recessed portion into which the power receiving element is disposed.

In some embodiments, the apparatus may further include a ferrite material disposed between the power receiving element and the metal layer.

In some embodiments, the apparatus may further include a ferrite material having first and second portions that sandwich the power receiving element between the first and second portions.

In some embodiments, the support substrate may comprise a carbon-fiber compound, carbon nanotube materials, ceramics based materials, or fiberglass, or a combination thereof.

In some embodiments, the metal layer may comprise at least one of copper, aluminum, magnesium, carbon steel, titanium, or stainless steel, or a combination thereof.

In accordance with aspects of the present disclosure a method for wireless power reception in an electronic device may include magnetically coupling a power receiving element disposed on a surface of a non-conductive support substrate to an externally generated magnetic field through a metal layer disposed on a non-conductive support substrate. A voltage induced in the power receiving element in response to coupling to the externally generated magnetic field may be rectified to produce a DC voltage. The electronic device may be powered using the DC voltage.

In some embodiments, the method may further include tuning the power receiving element to have resonant frequency equal to a frequency of the externally generated magnetic field.

In accordance with aspects of the present disclosure an apparatus for wireless power reception in an electronic device may include a metal casing portion configured to house electronic components of the electronic device and a power receiving element positioned on an interior side of the metal case portion. The power receiving element may be configured to magnetically couple to a magnetic field generated by the metal casing portion in response to eddy currents induced in the metal casing portion to produce power for one or more of the electronic components of the electronic device. The eddy currents may be induced in response to exposure of the metal casing portion to an externally generated magnetic field.

In some embodiments, the power receiving element may be arranged relative to an area of the metal layer that defines a continuous, unbroken, uninterrupted surface.

In some embodiments, the apparatus may further include a ferrite material disposed between the power receiving element and the metal back cover.

In some embodiments, the apparatus may further include a ferrite material having first and second portions that sandwich the power receiving element between the first and second portions.

In some embodiments, the metal back cover may comprise at least one of copper, aluminum, magnesium, carbon steel, titanium, or stainless steel, or a combination thereof.

In some embodiments, the metal back cover may have a thickness of 1 mm or less.

In some embodiments, the metal casing portion may comprise a non-conductive support substrate and a metal layer disposed on the support substrate. A thickness of the metal layer can be insufficient to provide structural support to the housing. The metal layer may have a thickness of 0.01 mm or less. A frequency of the externally generated magnetic field may be 300 KHz or less. The support substrate may comprise a carbon-fiber compound, carbon nanotube materials, ceramics based materials, or fiberglass, or a combination thereof.

In accordance with aspects of the present disclosure a method for wireless power reception in an electronic device may include inducing eddy currents in at least a given area of a metal back cover defined by a continuous, unbroken, uninterrupted portion of material that comprises the metal back cover in response to exposing the metal back cover to an externally generated magnetic field. The method may include generating a magnetic field that emanates from the metal back cover in response to the induced eddy currents. The generated magnetic field may be coupled to a power receiving element that may be disposed within the given area of the metal back cover. The generated power from the power receiving element may be provided to one or more of the electronic components of the electronic device.

In some embodiments, the method may further include coupling the generated magnetic field to the power receiving element using a ferrite material.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings:

FIGS. 5A and 5B illustrate a casing portion in accordance with other embodiments.

FIGS. 13A, 13B, 14A, 14B, 15A, and 15B show various plots for direction of magnetic flux lines and magnetic field strength at different excitation frequencies.

DETAILED DESCRIPTION

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "power receiving element" to achieve power transfer.

Figure 1:
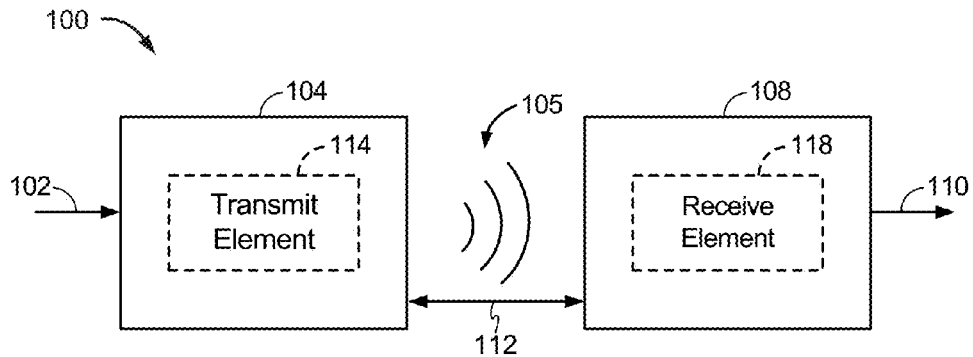
FIG. 1 is a functional block diagram of a wireless power transfer system in accordance with an illustrative embodiment.

FIG. 1 is a functional block diagram of a wireless power transfer system 100, in accordance with an illustrative embodiment. Input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate output power 110 for storing or consumption by a device (not shown in this figure) coupled to the output power 110. The transmitter 104 and the receiver 108 may be separated by a distance 112. The transmitter 104 may include a power transmitting element 114 for transmitting/coupling energy to the receiver 108. The receiver 108 may include a power receiving element 118 for receiving or capturing/coupling energy transmitted from the transmitter 104.

In one illustrative embodiment, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over larger distances. Resonant inductive coupling techniques may thus allow for improved efficiency and power transfer over various distances and with a variety of inductive power transmitting and receiving element configurations.

In certain embodiments, the wireless field 105 may correspond to the "near field" of the transmitter 104. The near-field may correspond to a region in which there are strong reactive fields resulting from the currents and charges in the power transmitting element 114 that minimally radiate power away from the power transmitting element 114. The near-field may correspond to a region that is within about one wavelength (or a fraction thereof) of the power transmitting element 114.

In certain embodiments, efficient energy transfer may occur by coupling a large portion of the energy in the wireless field 105 to the power receiving element 118 rather than propagating most of the energy in an electromagnetic wave to the far field.

In certain implementations, the transmitter 104 may output a time varying magnetic (or electromagnetic) field 105 with a frequency corresponding to the resonant frequency of the power transmitting element 114. When the receiver 108 is within the wireless field 105, the time varying magnetic (or electromagnetic) field may induce a current in the power receiving element 118. As described above, if the power receiving element 118 is configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge or to power a load.

Figure 2:
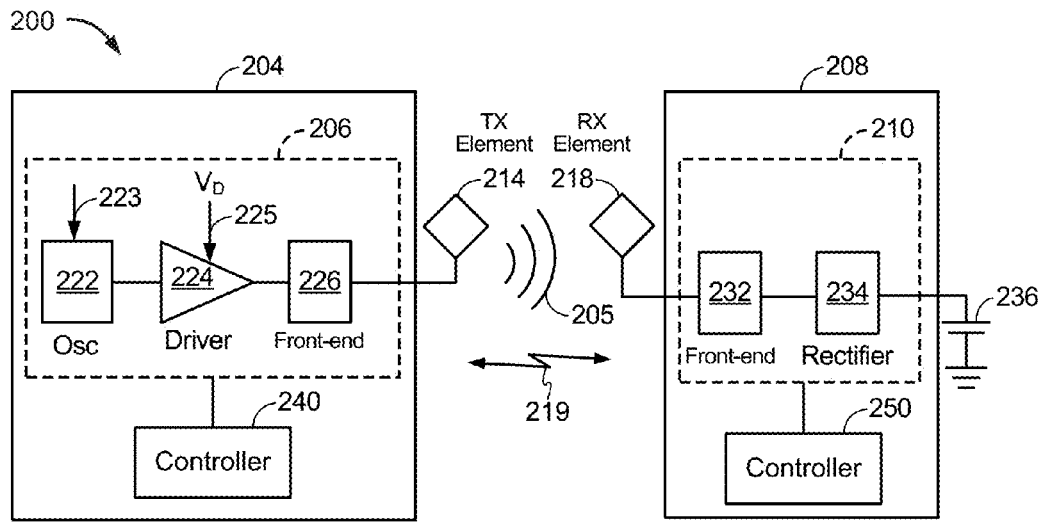
FIG. 2 is a functional block diagram of a wireless power transfer system in accordance with an illustrative embodiment.

FIG. 2 is a functional block diagram of a wireless power transfer system 200, in accordance with another illustrative embodiment. The system 200 may include a transmitter 204 and a receiver 208. The transmitter 204 (also referred to herein as power transfer unit, PTU) may include transmit circuitry 206 that may include an oscillator 222, a driver circuit 224, and a front-end circuit 226. The oscillator 222 may be configured to generate an oscillator signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a switching amplifier configured to receive a square wave from the oscillator 222 and output a sine wave.

The front-end circuit 226 may include a filter circuit configured to filter out harmonics or other unwanted frequencies. The front-end circuit 226 may include a matching circuit configured to match the impedance of the transmitter 204 to the impedance of the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or otherwise powering a load.

The transmitter 204 may further include a controller 240 operably coupled to the transmit circuitry 206 and configured to control one or more aspects of the transmit circuitry 206, or accomplish other operations relevant to managing the transfer of power. The controller 240 may be a microcontroller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by it. The transmitter 204 may further include a memory (not shown) configured to store data, for example, such as instructions for causing the controller 240 to perform particular functions, such as those related to management of wireless power transfer.

The receiver 208 (also referred to herein as power receiving unit, PRU) may include receive circuitry 210 that may include a front-end circuit 232 and a rectifier circuit 234. The front-end circuit 232 may include matching circuitry configured to match the impedance of the receive circuitry 210 to the impedance of the power receiving element 218. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. In certain embodiments, the transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output or receive circuitry 210.

The receiver 208 may further include a controller 250 configured similarly to the transmit controller 240 as described above for managing one or more aspects of the wireless power receiver 208. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to minimize transmission losses between the transmitter 204 and the receiver 208.

Figure 3:
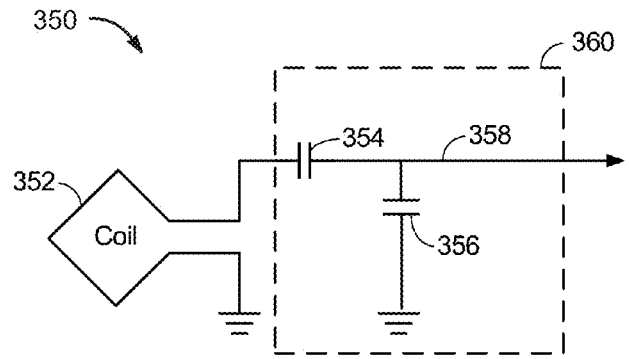
FIG. 3 is a schematic diagram of a portion of transmit circuitry or receive circuitry of FIG. 2 including a power transmitting or receiving element in accordance with an illustrative embodiment.

FIG. 3 is a schematic diagram of a portion of the transmit circuitry 206 or the receive circuitry 210 of FIG. 2, in accordance with illustrative embodiments. As illustrated in FIG. 3, transmit or receive circuitry 350 may include a power transmitting or receiving element 352 and a tuning circuit 360. The power transmitting or receiving element 352 may also be referred to or be configured as an antenna or a "loop" antenna. The term "antenna" generally refers to a component that may wirelessly output or receive energy for coupling to another antenna. The power transmitting or receiving element 352 may also be referred to herein or be configured as a "magnetic" antenna, or an induction coil, a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown in this figure).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil and/or other inductor forming the power transmitting or receiving element 352. Capacitance (e.g., a capacitor) may be provided by the tuning circuit 360 to create a resonant structure at a desired resonant frequency. As a non limiting example, the tuning circuit 360 may comprise a capacitor 354 and a capacitor 356, which may be added to the transmit and/or receive circuitry 350 to create a resonant circuit.

The tuning circuit 360 may include other components to form a resonant circuit with the power transmitting or receiving element 352. As another non limiting example, the tuning circuit 360 may include a capacitor (not shown) placed in parallel between the two terminals of the circuitry 350. Still other designs are possible. In some embodiments, the tuning circuit in the front-end circuit 226 may have the same design (e.g., 360) as the tuning circuit in front-end circuit 232. In other embodiments, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352. Although aspects disclosed herein may be generally directed to resonant wireless power transfer, persons of ordinary skill will appreciate that aspects disclosed herein may be used in non-resonant implementations for wireless power transfer.

Figure 4:
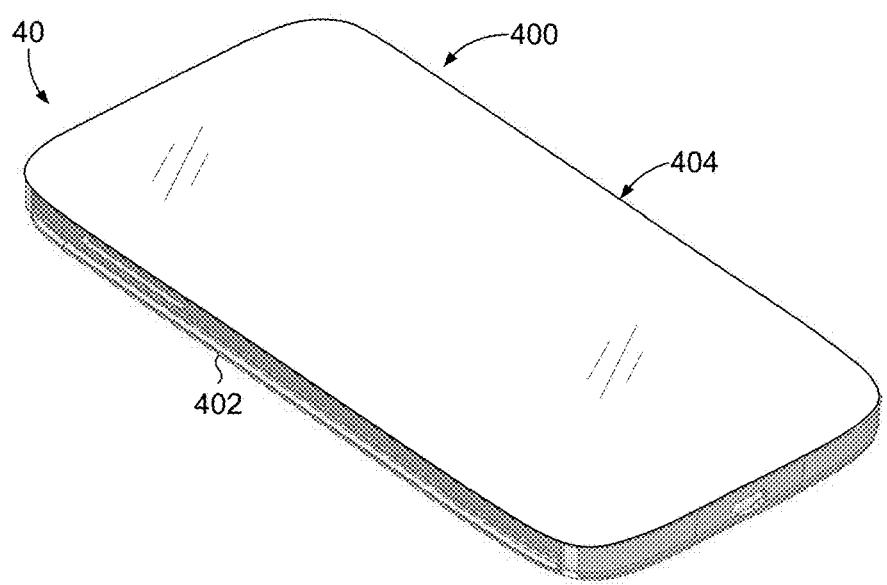
FIG. 4 illustrates an example of an enclosure to house the components of an electronic device.

Referring to FIG. 4, the discussion will now turn to a description of wireless power reception in an electronic device in accordance with embodiments of the present disclosure. FIG. 4 shows an electronic device 40, such as a smartphone for example. It will be understood, however, in other embodiments the electronic device 40 may be any portable electronic device such as a laptop, a computer tablet, and so on. The electronic device 40 may include means for enclosing the electronic components (not shown) that comprise the electronic device 40; for example, enclosure 400. In some embodiments, the enclosure 400 may include a casing 402. The enclosure 400 may further include a transparent display cover 404, for example, such as in a smartphone or other computing device having a display. The casing 402 may house the electronic components of the electronic device 40.

Figure 5:
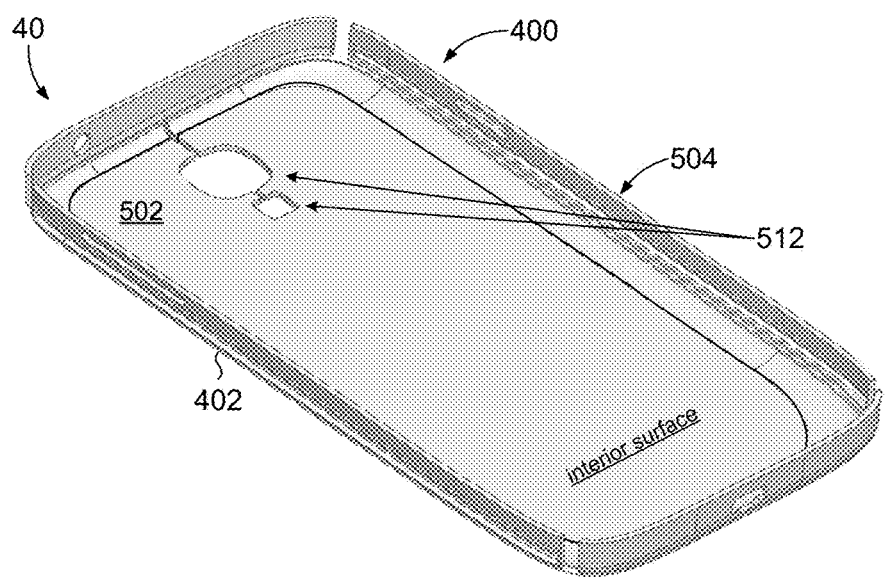
FIG. 5 illustrates a casing portion of the enclosure depicted in FIG. 4 in accordance with some embodiments.

FIG. 5 shows the casing 402 portion of the enclosure 400 with the display cover 404 removed and electronic components of the electronic device 40 taken out of the casing 402. In some embodiments, the casing 402 may be entirely metal. In other embodiments, the casing 400 may comprise at least a metal back cover portion 502 (metal back cover) supported by a frame portion 504. The frame portion 504 may comprise a non-metallic material, or a combination of metallic and non-metallic materials.

In some embodiments, the metal back cover 502 may have one or more openings 512 formed through the material that comprises the metal back cover 502. The openings 512, for example, may be to expose the lens and flash unit of a camera (not shown) of the electronic device 40. The metal back cover 502 may otherwise be a continuous, uninterrupted, unbroken surface, as shown in FIG. 5 for example. In accordance with the present disclosure, the casing 402 may be configured to allow for wireless transfer of power to the electronic components (not shown) of the electronic device 40. This aspect of the present disclosure is discussed below.

Referring to FIG. 5A, in some embodiments the electronic device 40 may not require openings on the back side of the device; for example, a computer tablet may have only a front-facing camera. Accordingly, in some embodiments the electronic device 40 may employ a metal back cover 502' that has no openings formed through the material. The metal back cover 502' may have a solid, unbroken, uninterrupted, continuous surface with no openings formed through it, such as shown in FIG. 5A.

FIG. 5B shows an embodiment of an electronic device 40' in accordance with some embodiments of the present disclosure. The electronic device 40' may include means for enclosing electronic components 52 that comprise the electronic device 40'; for example, enclosure 400'. In some embodiments, the enclosure 400' may include a casing 402' to house the electronic components 52. In accordance with the present disclosure, the casing 402' may include a non-conductive shell (support substrate) 504' and a thin metal layer 522. In some embodiments, the thin metal layer 522 formed on the support substrate 504' may serve as the metal back cover 502 (FIG. 5) which has openings for a camera lens and such. In other embodiments, the thin metal layer 522 may serve as the metal back cover 502' (FIG. 5A) which has no openings.

As explained below, the thin metal layer 522 may have insufficient structural integrity due to its thin dimension. Accordingly, the support substrate 504' may serve to provide mechanical stiffness and other structural support for the electronic device 40'. The support substrate 504' may comprise any electrically non-conductive material. In some embodiments, the support substrate 504' may be non-ferromagnetic as well. Suitable materials may be lightweight, have strong mechanical properties, and have good heat dissipation performance to dissipate heat generated by the electronic components 52. In some embodiments, for example, a carbon-fiber compound may be used. It will be appreciated, however, that in other embodiments other materials may be used such as carbon nanotube materials, ceramics based materials, fiberglass, and the like.

In accordance with the present disclosure, the casing 402' may be configured for wireless transfer of power to the electronic components 52 of the electronic device 40'. The thin metal layer 522 may be made from any suitable electrically conductive material, such as for example, aluminum, magnesium, carbon steel, stainless steel, other metallic alloys, and the like. In some embodiments, the thin metal layer 522 may have a thickness less than 0.1 mm in order to facilitate wireless power transfer. In a particular embodiment, for example, the thickness of thin metal layer 522 may be 0.7 mils (approximately 0.018 mm) or less. In some embodiments, the thin metal layer 522 may be formed as part separate from the support substrate 504' and then attached to the support substrate 504'. In other embodiments, the thin metal layer 504' may be deposited onto the support substrate 504', for example, using a suitable deposition method.

In accordance with the present disclosure, the thin metal layer 522 may serve a dual purpose. The use of a metallic material for the back cover of the electronic device 40' allows for the incorporation of an aesthetic design element to the electronic device 40'. At the same time, the task of housing the electronic components 52 and providing structural support for the electronic device 40' is provided by the support substrate 504' rather than the thin metal layer 522. This allows the thin metal layer 522 to be configured for the wireless transfer of power to the electronic device 40'. This aspect of the present disclosure is discussed in more detail below.

Figure 6:
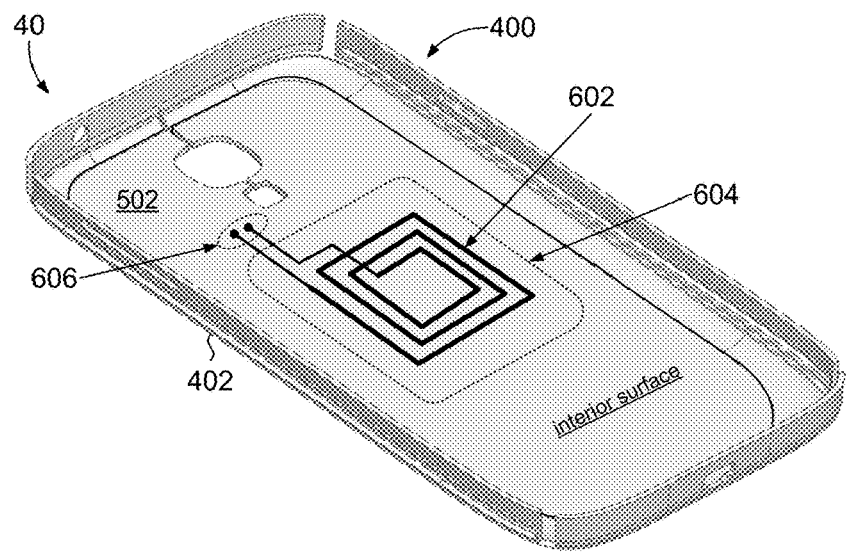
FIG. 6 illustrates a configuration of a power receiving element in accordance with some embodiments.

As noted above, with respect to FIG. 4, the casing 402 may be configured to allow for wireless transfer of power to the electronic components (not shown) of the electronic device 40. Referring to FIG. 6, for example, in some embodiments the casing 402 may include an electrically conductive power receiving element 602 disposed on the interior surface of the metal back cover 502 of the casing 402. More particularly, the power receiving element 602 may be disposed in a given area 604 of the metal back cover 502 that is defined by a solid, unbroken, uninterrupted, continuous surface portion of the material used for the metal back cover 502.

In some embodiments, the power receiving element 602 may comprise a conductive trace formed on a flexible printed circuit board (PCB), for example, by printing, etching, photolithography, etc. The power receiving element 602 may be formed in the shape of a coil having any number of turns. FIG. 6, for example, shows that power receiving element 602 comprises three turns. In some embodiments, the power receiving element 602 may have additional turns. The power receiving element 602 may be affixed directly to the interior surface of metal back cover 502, for example, using an adhesive, epoxy material, or other suitable affixing means.

The power receiving element 602 may include or otherwise be connected to terminals 606 to provide power to electronic components (not shown) of the electronic device 40. In some embodiments, for example, the terminals 606 may be connected to a rectifier circuit (not shown) to produce a DC voltage that can be provided to the electronic components; for example, a rechargeable battery, a power management circuit, and so on.

Figure 6A:
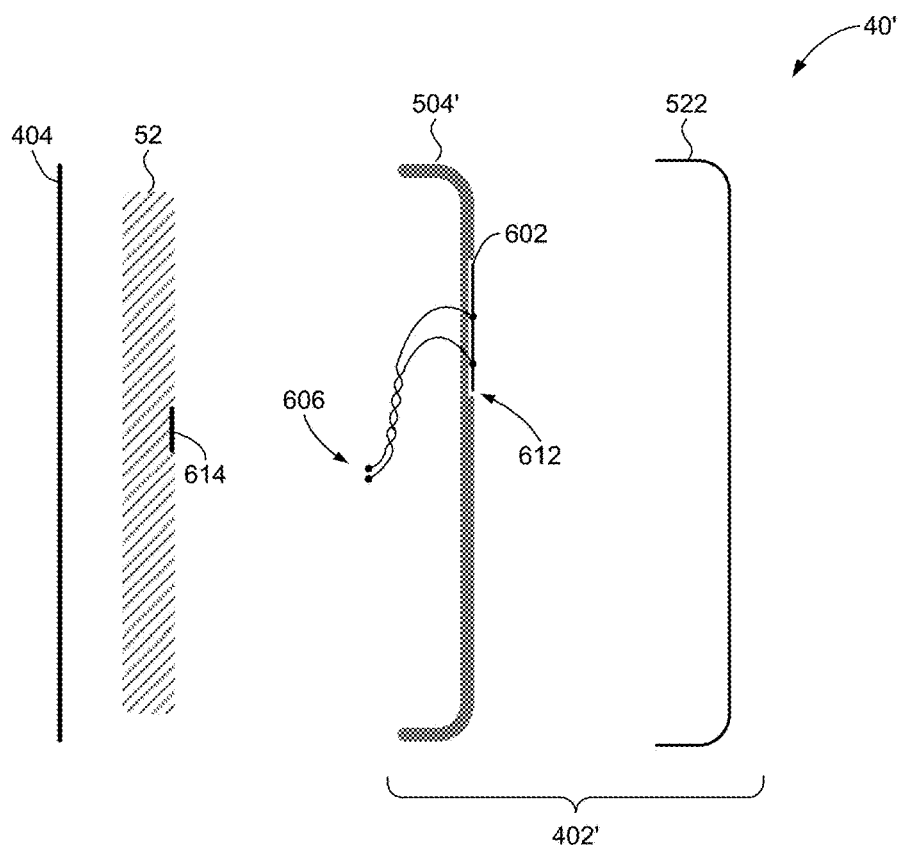
FIGS. 6A and 6B illustrate a configuration of a power receiving element in accordance with other embodiments.
Figure 6B:
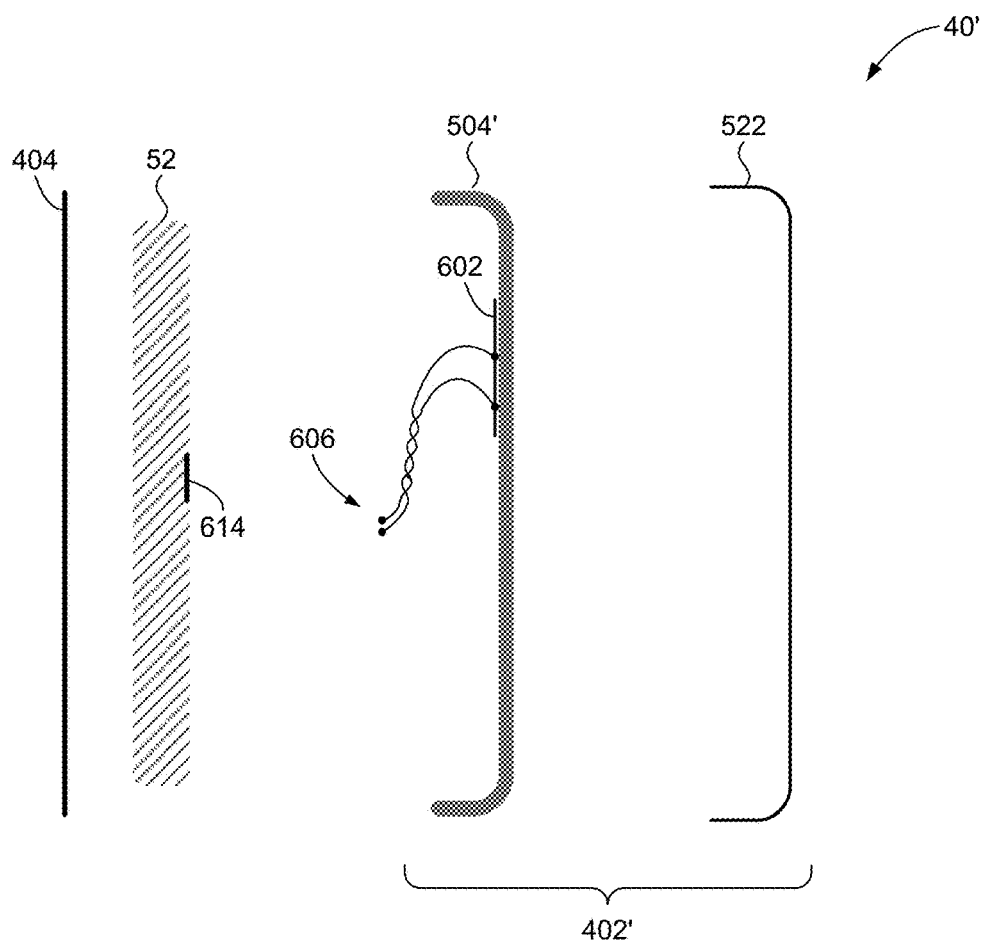

Referring to FIGS. 6A and 6B, the casing 402' shown in FIG. 5B may likewise include an electrically conductive power receiving element 602. In some embodiments, the power receiving element 602 may be disposed on the support substrate 504' FIG. 6A, for example, shows an exploded view of electronic device 40', illustrating some additional details in accordance with the present disclosure. In some embodiments, a recessed portion 612 may be formed in the outwardly facing surface of the support substrate 504' to hold the power receiving element 602. The recessed portion 612 may be provided so that the thin metal layer 522 can be formed (e.g., as an inlay) atop the power receiving element 602 without any bumps on the surface of thin metal layer 522. In other embodiments, the power receiving element 602 may be formed directly atop the surface of the support substrate 504' without a recessed portion; for example, so that an outline of some or all of power receiving element 602 in the design can be incorporated in the design of the backside of the casing 402'.

The power receiving element 602 may include terminals 606 for connection to a rectifier circuit 614 in the electronic components 52 of the electronic device 40'. FIG. 6B illustrates an example of an embodiment in which the power receiving element 602 may be arranged on the inwardly facing surface of the support substrate 504'. The figure shows the power receiving element 602 disposed on the inwardly facing surface of support substrate 504', but in other embodiments the power receiving element 602 may be arranged in a recess similar to the arrangement shown in FIG. 6A.

Figure 7:
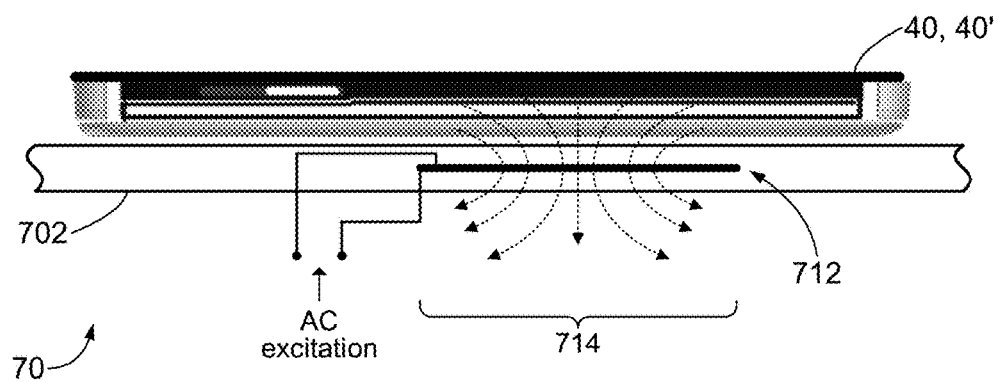
FIG. 7 illustrates an arrangement for wireless power transfer.

Referring to FIG. 7, wireless power transfer may include placing the electronic device 40, 40' in proximity to a charging surface (charging pad, etc.) 702 of a wireless power transmitting device 70. The charging surface 702 may include a transmit coil 712. During a wireless power transfer operation, the transmit coil 712 may be energized, for example, by providing an AC excitation current to the transmit coil 712. In response, the transmit coil 712 may generate a magnetic field 714. When the electronic device 40, 40' is placed in proximity to the charging surface 702, the externally generated magnetic field 714 may couple to the power receiving element (602, FIG. 6) in the electronic device 40, 40'. This aspect of the present disclosure will be explained in more detail in connection with FIG. 8. The AC excitation current may operate any suitable frequency. In some embodiments, for example, the AC excitation current may operate at frequencies according to any of the various standards for wireless power transfer. For example, the AirFuel/A4WP (Alliance for Wireless Power) wireless power transfer standard specifies an operating frequency of 6.87 MHz and the WPC wireless power standard, developed by the Wireless Power Consortium (WPC), specifies frequencies in the range of 100-300 KHz.

Figure 8:
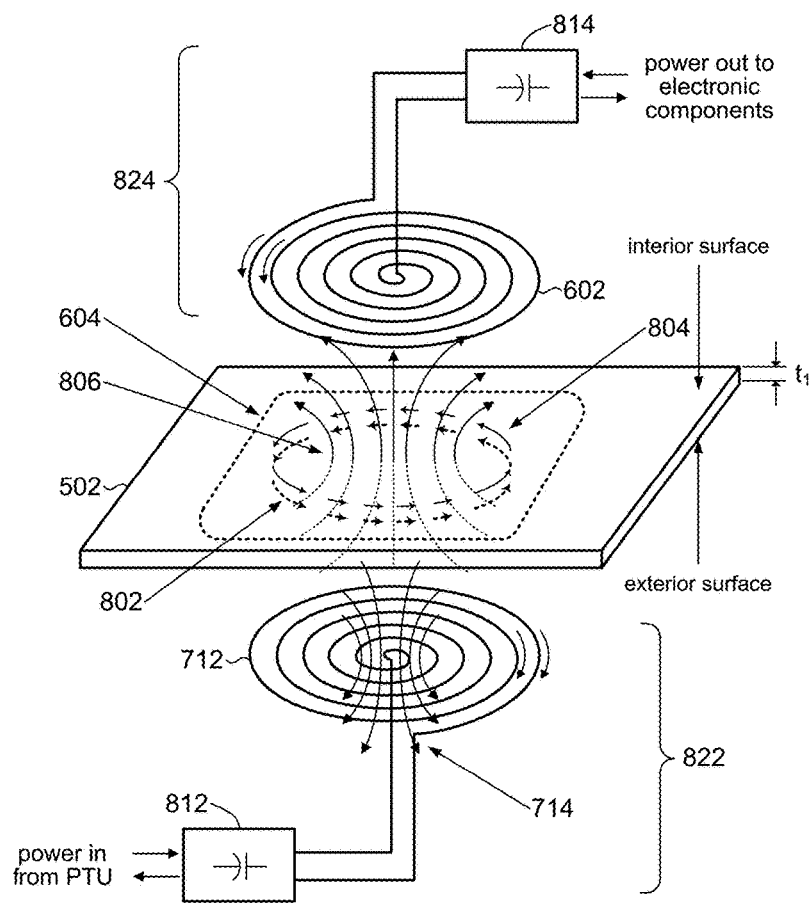
FIGS. 8, 8A, and 8B illustrate details for wireless power transfer in accordance with some embodiments.

FIG. 8 shows additional detail in the area 604 of the metal back cover 502 of the casing (402, FIG. 6). The casing 402 may include means for inducing eddy currents. For example, the externally generated magnetic field 714 may induce eddy currents in the metal back cover 502. The eddy currents may circulate in planes perpendicular to the magnetic flux of the externally generated magnetic field 714. In order to avoid cluttering the figure, FIG. 8 shows eddy currents 802, 804 only in the area 604 of the metal back cover 502. It will be understood by persons of ordinary skill, however, that eddy currents are not necessarily restricted to the area 604.

Figure 8A:
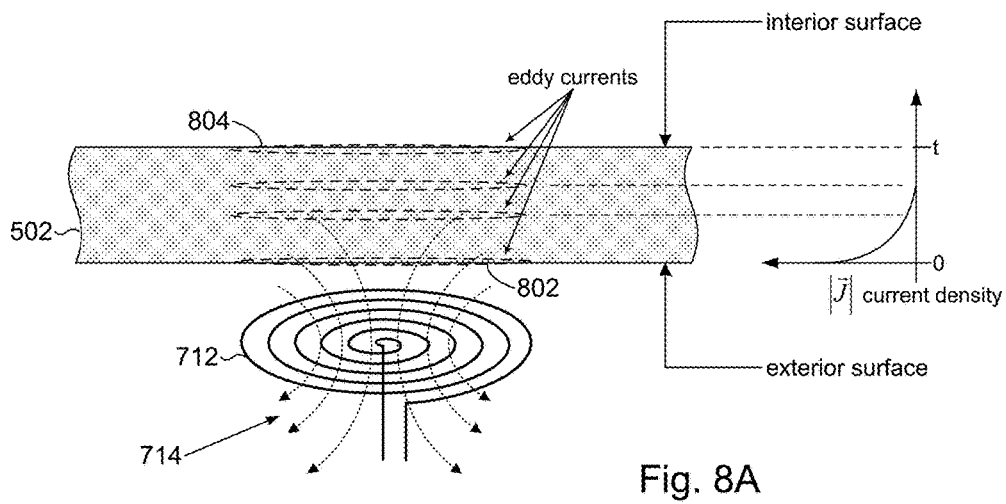

Eddy currents generally concentrate near the exterior surface of the metal back cover 502 surface adjacent to the transmit coil 712, due to the skin effect. The density of the eddy currents decreases (decays) with distance from the exterior surface of the metal back cover 502 toward the interior surface of the metal back cover 502. Accordingly, the density of eddy currents 802 at the exterior surface of the metal back cover 502 is greater than the density of eddy currents 804 at the interior surface of the metal back cover 502. FIG. 8A illustrates this graphically using a plot of current density the eddy currents at different depths (t) in the metal back cover 502, where the exterior surface defines a depth of t=0.

The depth of penetration ("skin depth") of the eddy currents into the metal back cover 502 varies with the frequency of the power used (e.g., AC excitation current) to excite the transmit coil 712 and the material that comprises the metal back cover 502. The skin depth may be expressed by the following:

$$\delta = \frac{1}{\sqrt{\pi f \mu \sigma}},$$

where δ is the skin depth, f is the excitation frequency,

μ is the permeability of the material, and

σ is the conductivity of the material.

In some embodiments, the excitation frequency of the power used to excite the transmit coil 712 may be in the 10's of KHz to 100's of KHz; for example, the WPC standard specifies frequencies in the range 100-300 KHz. In some embodiments, the transmit coil 712 may be connected to a tuning circuit 812 to define a resonant circuit 822. The excitation frequency may be substantially equal to a resonant frequency of the resonant circuit 822. The tuning circuit 812 may be any suitable combination of reactive elements (e.g., a capacitor network). In some embodiments, the power receiving element 602 may be connected to a tuning circuit 814 to define a resonant circuit 824 that has a resonant frequency substantially equal to the excitation frequency of the power used to excite the transmit coil 712. The tuning circuit 814, likewise, may be any suitable combination of reactive elements, such as a capacitor network for example. As an example, the tuning circuits 812, 814 may use the circuit design of tuning circuit 360 shown in FIG. 3. It will be understood that in various embodiments, the tuning circuits 812, 814 may employ any suitable circuit design.

In response to the eddy currents 802, 804, a magnetic field 806 can be generated in the metal back cover 502 that emanates from the metal back cover 502. In accordance with the present disclosure, means may be provided to couple to the magnetic field 806 generated by the eddy currents 802, 804. For example, portions of the magnetic field 806 that emanate from interior surface of area 604 in the metal back cover 502 may couple to the power receiving element 602 of the electronic device 40 (FIG. 6). This can induce a flow of current in the power receiving element 602, which can be rectified and provided to electronic components (not shown) of the electronic device 40.

In some embodiments, the material for metal back cover 502 may include metals such as copper, aluminum, magnesium, carbon steel, titanium, stainless steel, and the like. In other embodiments, the metal back cover 502 may comprise a combination (e.g., a composite of metals, an alloy of metals, etc.) of two or more of copper, aluminum, magnesium, carbon steel, titanium, stainless steel. In other embodiments, other suitable metals may be used, individually or in combination. The use of these materials allow for the metal back cover 502 to be sufficiently thin to allow for a skin depth that allows sufficient eddy currents to form at the interior surface of the metal back cover 502 to generate a magnetic field for wireless power transfer. In some embodiments, FIG. 8 for example, the thickness $t_1$ of the material may be less the 1.0 mm. In other embodiments, the thickness $t_1$ may be 0.5 mm to 0.7 mm. These thickness values are merely illustrative, and the thickness $t_1$ can be other values in other embodiments.

Figure 8B:
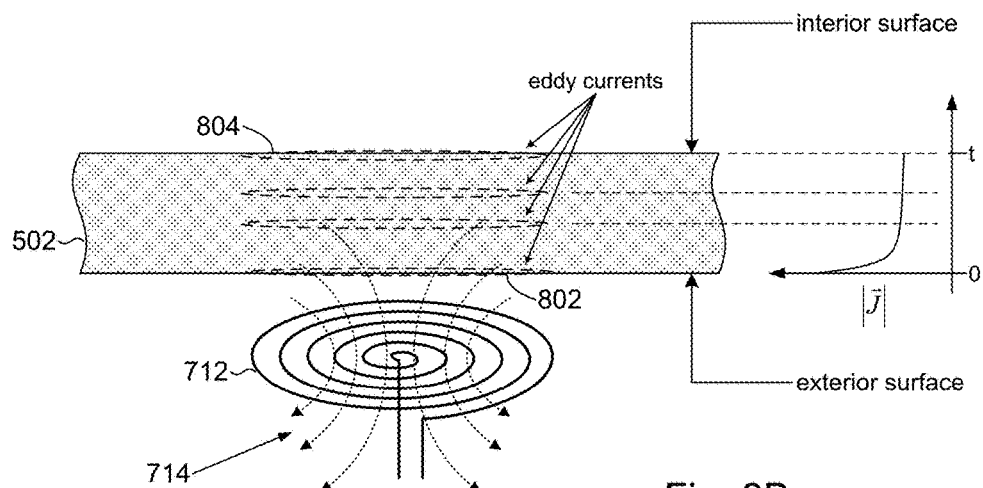

At certain excitation frequencies (e.g., >>100's kHz), the eddy currents can remain concentrated substantially to the exterior surface of the metal back cover 502 due to the skin effect, while eddy currents at the interior surface of the metal back cover 502 can be attenuated as illustrated by the graph in FIG. 8A. Accordingly, the magnetic field induced by the eddy currents at the interior surface of the metal back cover 502 may not couple sufficient power to the power receiving element 602. By comparison, at lower excitation frequencies (e.g., 150 KHz), eddy currents are less attenuated across the entire metal back cover 502 as illustrated by the graph in FIG. 8B. The eddy currents on the interior surface of the metal back cover 502 are therefore higher at a lower excitation frequency than at a higher excitation frequency, and thus can induce a stronger magnetic field from the interior surface to provide sufficiently strong coupling to the power receiving element 602.

Figure 8C:
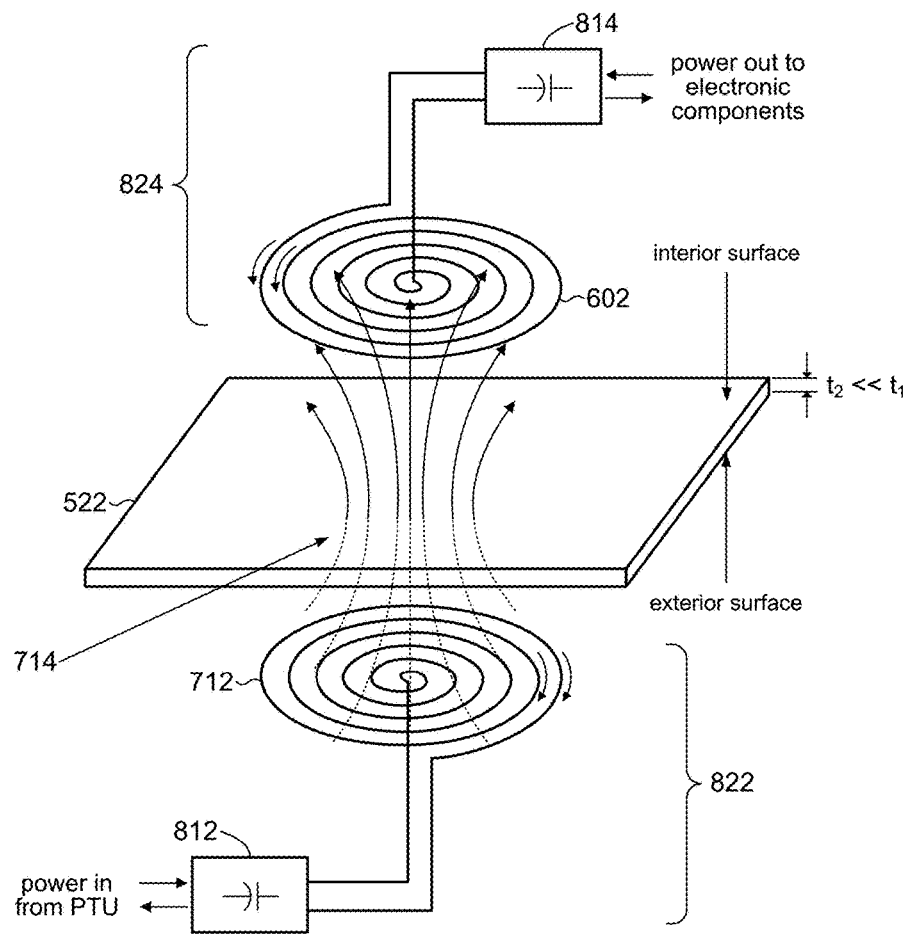
FIG. 8C illustrates wireless power transfer in accordance with other embodiments.

FIG. 8C illustrates operation when the metal back cover (e.g., 502, FIG. 5, 502', FIG. 5A) comprises a thin metal layer 522 (FIG. 5B). As described above, the thin metal layer 522 may have a thickness of about 0.01 mm or less, and in some embodiments may be suitable for wireless power transfer at low excitation frequencies; e.g., 300 KHz or less. In some embodiments, the externally generated magnetic field 714 may penetrate the thin metal layer 522, as depicted in FIG. 8C for example, and couple to the power receiving element 602. It is noted that the wireless standards and excitation frequencies disclosed herein are merely examples to illustrate this aspect of the present disclosure in the context of known wireless charging systems. It will be appreciated that the support substrate 504' can allow for the thickness of thin metal layer 522 to be adapted for a variety of different implementations to work with a variety of different frequency ranges, and is not necessarily limited to any particular frequency range.

Figure 9A:
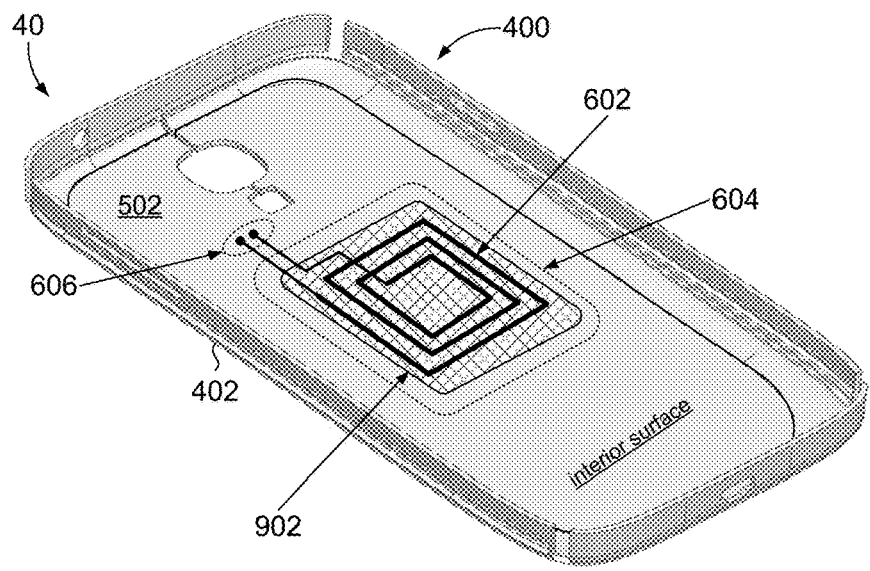
FIGS. 9A and 9B illustrate a configuration of the power receiving element using ferrite material in accordance with some embodiments.

Referring to FIG. 9A, in some embodiments, a layer of ferrite material 902 may be positioned between the power receiving element 602 and the metal back cover 502. The ferrite material 902 may serve to improve the mutual coupling of the generated magnetic field (806, FIG. 8) and the power receiving element 602. For example, the ferrite material 902 may enhance penetration of the externally generated magnetic field (714, FIG. 8) through the metal back cover 502, thus enhancing the induction of eddy currents in the metal back cover 502.

Figure 9B:
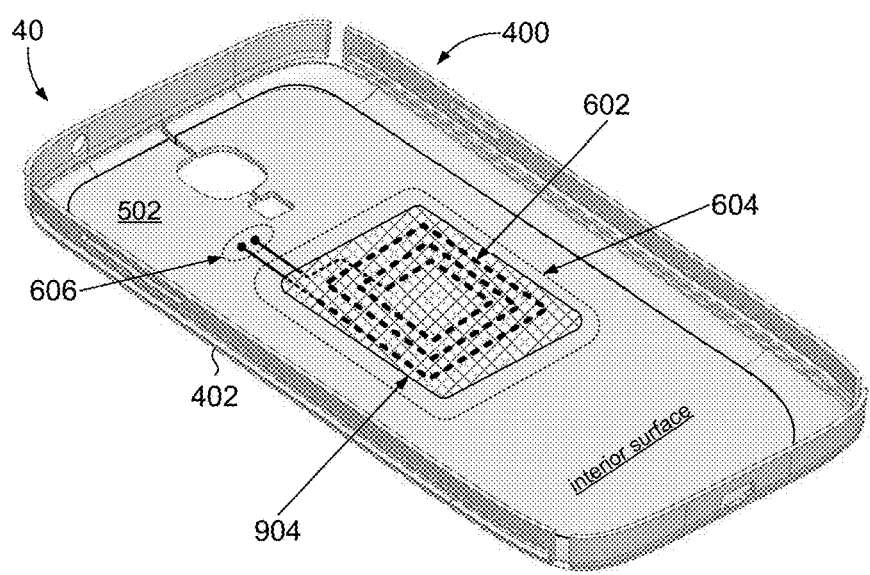

Referring to FIG. 9B, in some embodiments, a layer of ferrite material 904 maybe provided on top of the power receiving element 602 so that the power receiving element 602 is positioned between the ferrite material 904 and the metal back cover 502. The ferrite material 904 may serve to enhance the coupling of the magnetic field 806 generated in the metal back cover 502 to the power receiving element 602 as explained above. In addition, the ferrite material 904 may also serve to shield electronic components (not shown) comprising the electronic device 40 from the magnetic field 806. In still other embodiments, though not shown, the power receiving element 602 may be sandwiched between a first layer and a second layer of ferrite material. The ferrite material 902 may serve to channel the magnetic field 806 generated by the eddy currents such that flux is concentrated near the power receiving element 602.

Figure 9C:
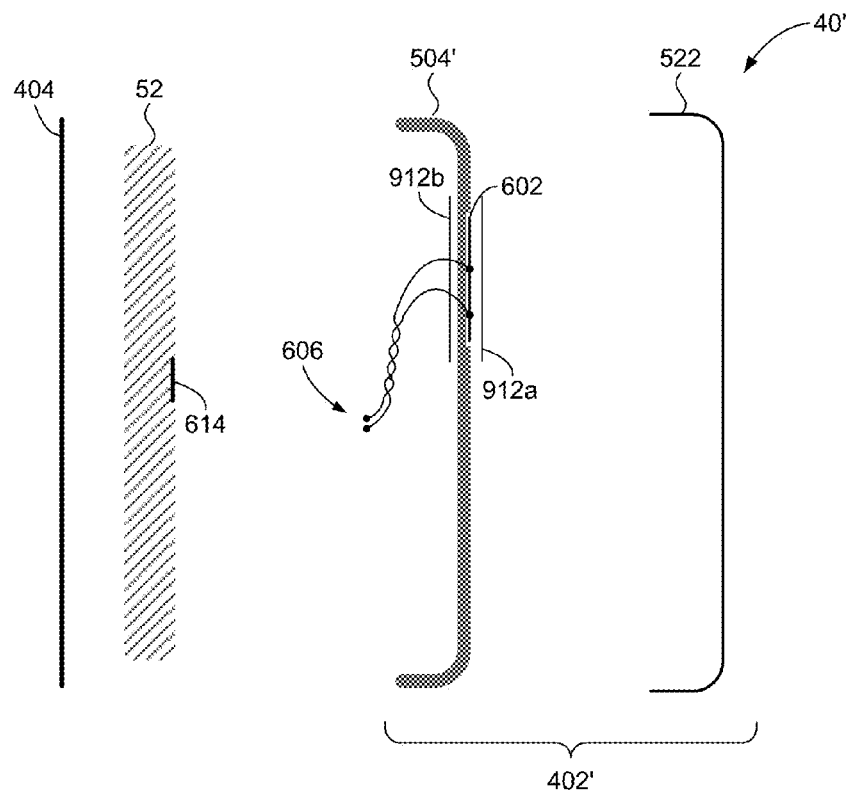
FIGS. 9C and 9D illustrate a configuration of the power receiving element using ferrite material in accordance with other embodiments.

Referring to FIG. 9C, in some embodiments, the power receiving element 602 may be disposed on the outwardly facing surface of the support structure 504', and a layer of ferrite material 912a may be provided between the power receiving element 602 and the thin metal layer 522 to enhance penetration of the externally generated magnetic field 714 through the thin metal layer 522 and improve mutual coupling between the externally generated magnetic field (714, FIG. 8C) and the power receiving element 602. In some embodiments, a layer of ferrite material 912b may be provided instead of or in addition to ferrite material 912a. The ferrite material 912b may be placed on the inside surface of the support structure 504'.

Figure 9D:
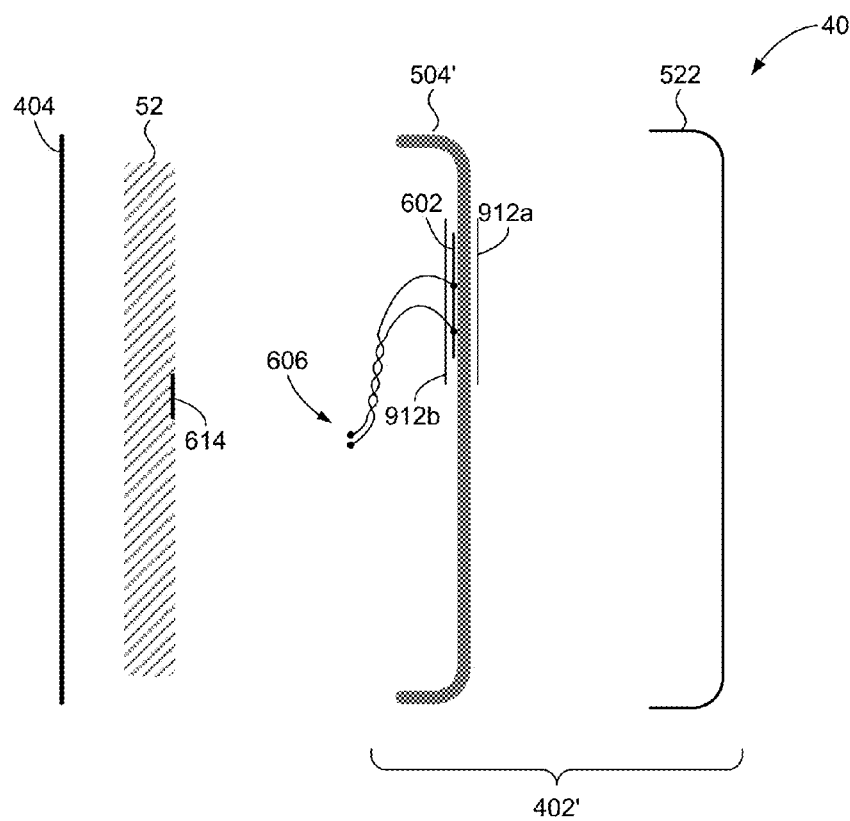

Referring to FIG. 9D, in some embodiments, the power receiving element 602 may be disposed on the inwardly facing surface of the support structure 504'. The layer of ferrite material 912b and support structure 504' may sandwich the power receiving element 602 to enhance penetration of the externally generated magnetic field 714 through the thin metal layer 522 and improve mutual coupling between the externally generated magnetic field (714, FIG. 8C) and the power receiving element 602. In some embodiments, the layer of ferrite material 912a may be provided instead of or in addition to ferrite material 912b.

The description will now turn to a discussion of some results from a High Frequency Structure Simulator (HFSS™) analysis of magnetic fields generated in a metal plate as a function of frequency of the external excitation magnetic field. In particular, a comparison of the generated magnetic flux for very low frequency external magnetic fields (e.g., about 60 kHz), low frequency external magnetic fields (e.g., about 115 kHz), and relatively high frequency external magnetic fields (e.g., about 6.78 MHz) will be discussed.

Figure 10:
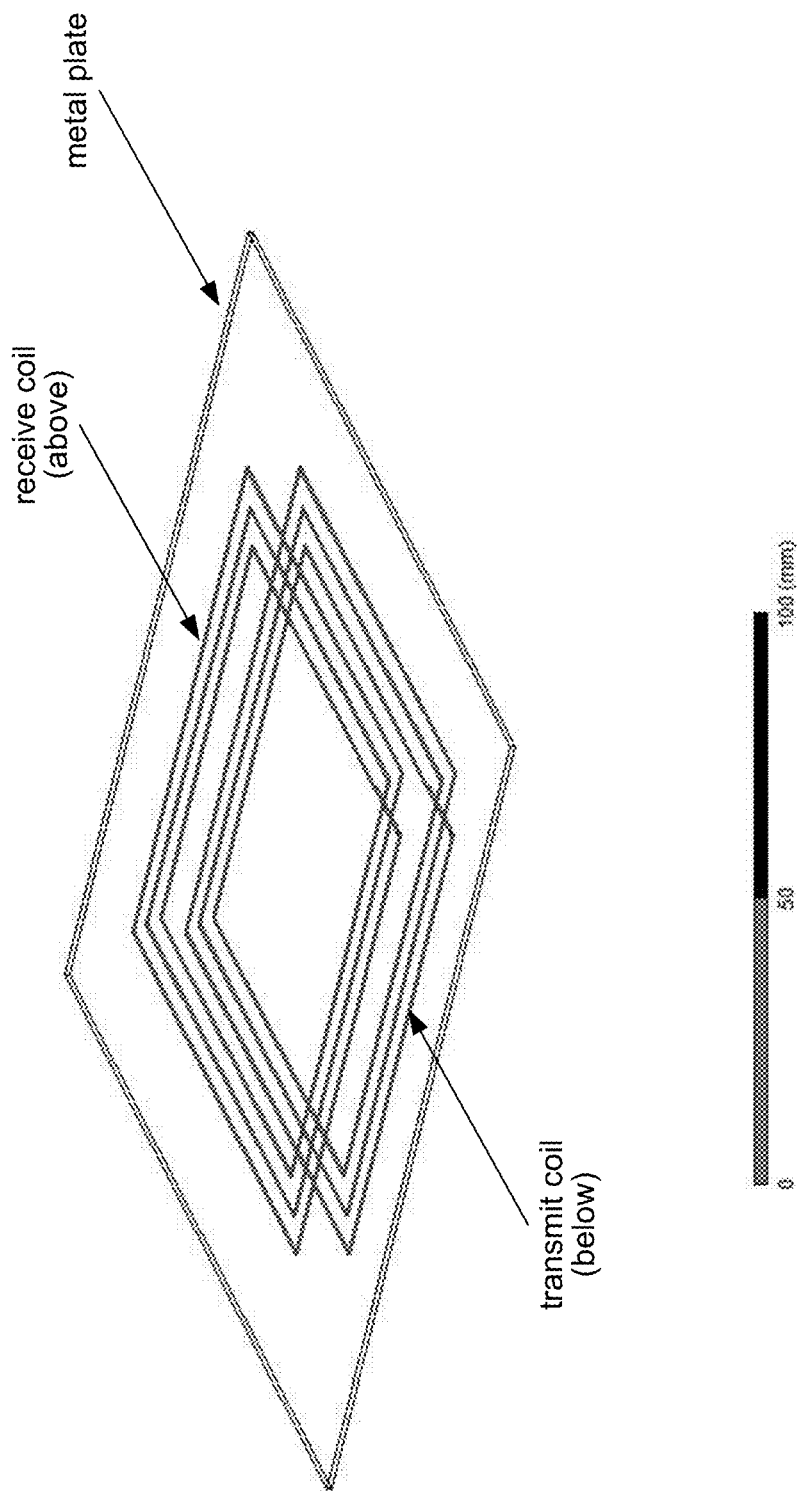
FIG. 10 illustrates a simulation set up.

FIG. 10 illustrates a setup for the simulation. For the purposes of the simulation, the receive and transmit coils are identical. The receive coil (e.g., power receiving element 602) is shown to be above the metal plate, and the transmit coil is shown to be below the metal plate. For the purposes of the simulation, the metal plate is characterized as having a thickness of 1 mm and a conductivity of 11000 siemens/m.

Figure 11A:
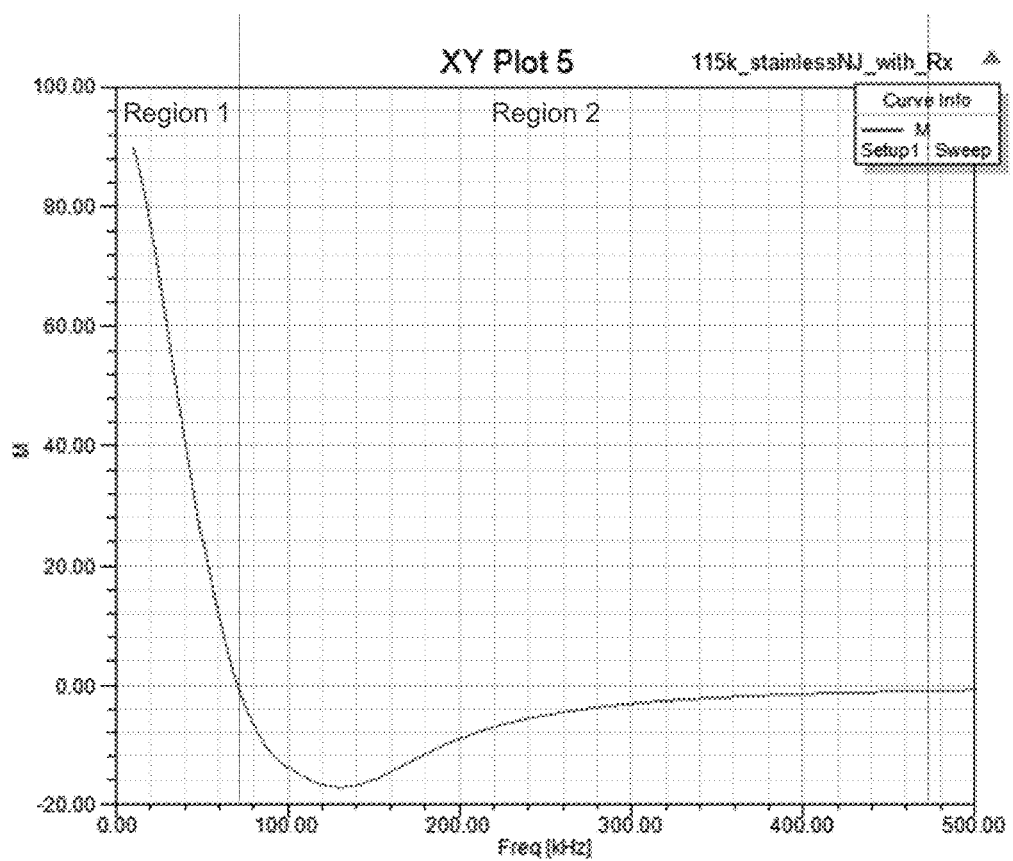
FIGS. 11A and 11B illustrate sweep frequency results across a range of excitation frequencies.
Figure 11B:
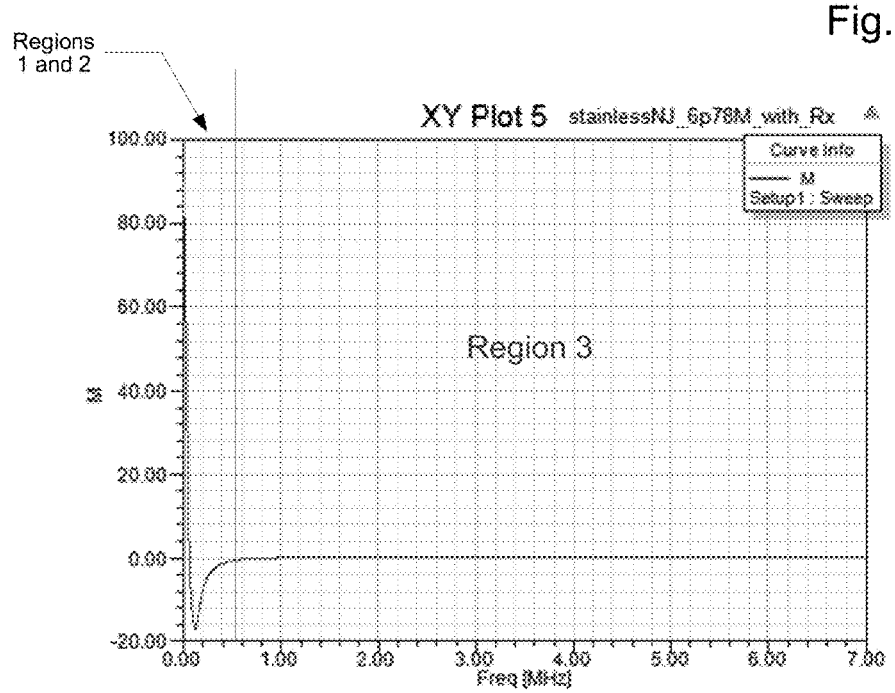
Figure 12:
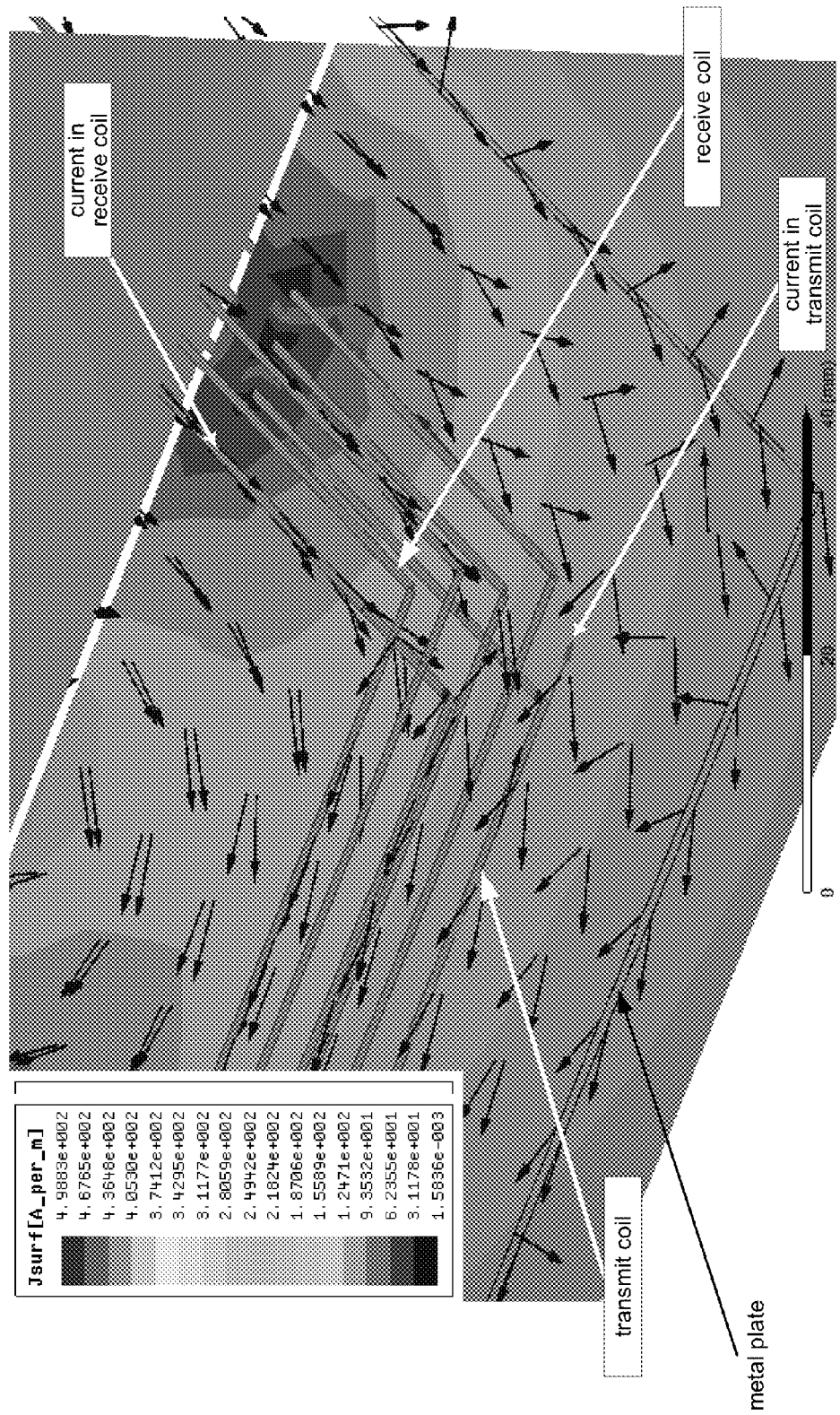
FIG. 12 shows the current flow in the transmit coil and the power receiving element.

FIGS. 11A and 11B illustrate a frequency sweep result for an electromagnetic simulation for the setup shown in FIG. 10. The simulation frequencies vary from about 60 kHz to 7 MHz. FIG. 11A shows the sweep result from 60 kHz to 500 kHz. The plot shows mutual inductance M on the vertical scale and frequency in kHz on the horizontal scale. FIG. 11B shows the sweep result from about 10 kHz to 7 MHz. The plot shows mutual inductance M on the vertical scale and frequency in MHz on the horizontal scale. Three regions (1, 2, 3) are defined based on frequency ranges. The map simulation of FIG. 12 shows that current in the transmit coil flows in the opposite direction as current in the receive coil and eddy currents in the metal plate. The strength of the surrounding magnetic field is shown in gray scale.

Referring to FIGS. 11A, 13A and 13B, for a given thickness of a metal plate (e.g. 1 mm), we see that at a very low frequency (60 kHz), M is positive because eddy currents on the metal plate are substantially uniformly strong and magnetic flux direction in the transmit coil is that same as the magnetic flux direction in the receive coil. The FIG. 13A shows the magnetic flux lines for very low frequency excitations. At low frequencies, the magnetic flux is additive. FIG. 13B shows a simulated heat map illustrating the field strength at different areas of the metal plate. The field strength is generally high on the side of the transmit coil and on the side of the receive coil, with an area of low field strength. The area of low field strength is due to the symmetry of the eddy current in that area of the metal plate.

Referring to FIGS. 11A, 14A and 14B, at a low frequency (115 kHz), mutual inductance M is negative because the eddy current is not uniform across the metal plate. This causes the induced magnetic flux to be directed in the opposite direction of the magnetic flux from the transmit coil. FIG. 14A shows the magnetic flux lines and FIG. 14B shows the corresponding magnitude of magnetic field strength. A weak area of magnetic field is observed around the center of the receive coil due to symmetry of the eddy current, similar to FIG. 13B.

Referring to FIGS. 11B, 15A and 15B, at a relatively high frequency (6.78 MHz), the eddy current on the metal plate is very small throughout the metal plate (FIG. 15A) and M is accordingly almost zero. FIG. 15B shows the field strength to be low for much of area on the side of the receive coil.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. An apparatus for wireless power reception in an electronic device, the apparatus comprising:
   a metal casing portion configured to house electronic components of the electronic device and to produce eddy currents through the metal casing portion in response to an exterior side of the metal casing portion being exposed to a first magnetic field; and
   a power receiving element positioned on an interior side of the metal casing portion, the power receiving element configured to magnetically couple to a second magnetic field generated by the eddy currents in the metal casing portion to produce power for one or more of the electronic components of the electronic device;
   wherein the power receiving element is arranged relative to an area of the metal casing portion that defines a continuous, unbroken, uninterrupted surface.

2. The apparatus of claim 1, further comprising a ferrite material disposed between the power receiving element and the metal casing portion.

3. The apparatus of claim 1, further comprising a ferrite material having first and second portions that sandwich the power receiving element between the first and second portions.

4. The apparatus of claim 1, wherein the metal casing portion comprises at least one of copper, aluminum, magnesium, carbon steel, titanium, or stainless steel, or a combination thereof.

5. The apparatus of claim 1, wherein the metal casing portion has a thickness of 0.01 mm or less.

6. The apparatus of claim 1, wherein the metal casing portion comprises a non-conductive support substrate and a metal layer disposed on the support substrate.

7. The apparatus of claim 6, wherein the metal layer has a thickness of 0.01 mm or less.

8. The apparatus f claim 6, wherein a frequency of the externally generated first magnetic field is 300 KHz or less.

9. The apparatus of claim 6, wherein the support substrate comprises a carbon-fiber compound, carbon nanotube materials, ceramics based materials, or fiberglass, or a combination thereof.

10. The apparatus of claim 6, wherein at least a part of the interior side of the metal casing portion is flat and the power receiving element comprises a planar coil lying in a plane parallel to the at least a part of the interior side of the metal casing portion.

11. A method for wireless power reception in an electronic device comprising:
   inducing eddy currents through at least a given area of a metal back cover defined by a continuous, unbroken, uninterrupted portion of material that comprises the metal back cover in response to exposing an exterior side of the metal back cover to an externally generated first magnetic field;

generating a second magnetic field that emanates from an interior side of the metal back cover in response to the induced eddy currents;

coupling the second magnetic field to a power receiving element that is disposed within the given area of the metal back cover; and providing generated power from the power receiving element to one or more electronic components of the electronic device.

12. The method of claim 11, further comprising coupling the second magnetic field to the power receiving element using a ferrite material.

* * * * *